July 29, 1952     H. C. HOWSAM     2,605,058
REEL AND DRUM THEREFOR
Filed May 26, 1949     3 Sheets-Sheet 1
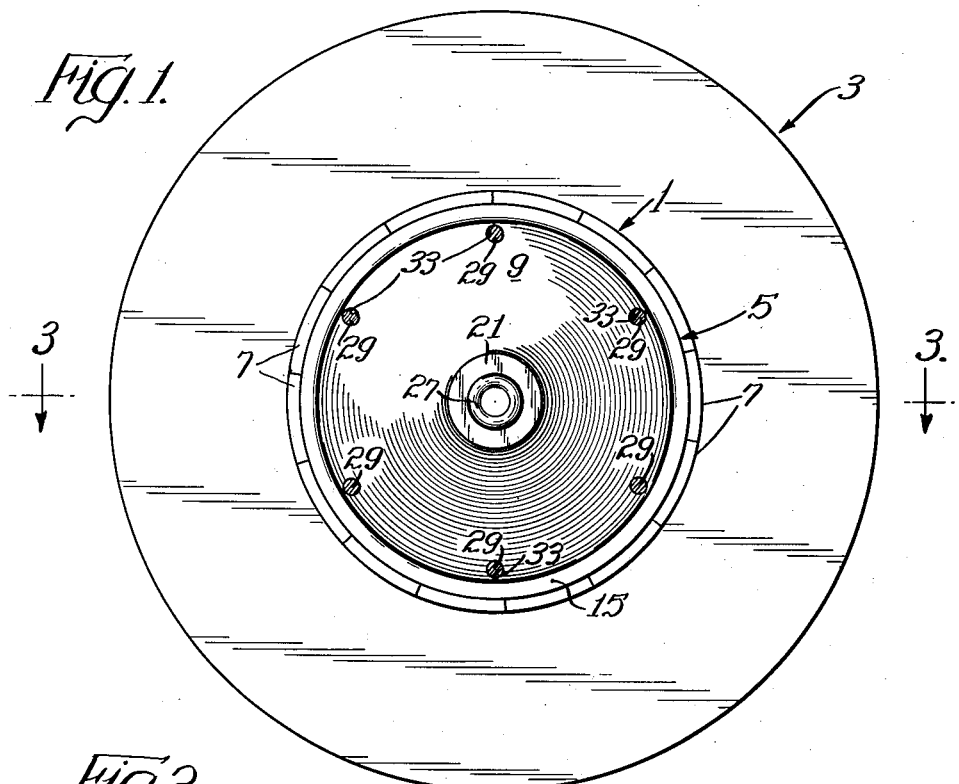
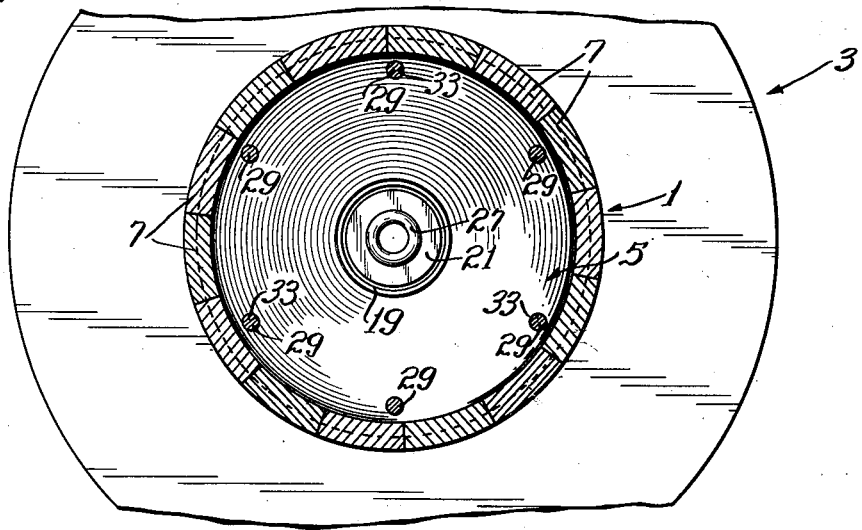
INVENTOR.
Hilyard C. Howsam July 29, 1952 H. C. HOWSAM 2,605,058
REEL AND DRUM THEREFOR
Filed May 26, 1949 3 Sheets-Sheet 2
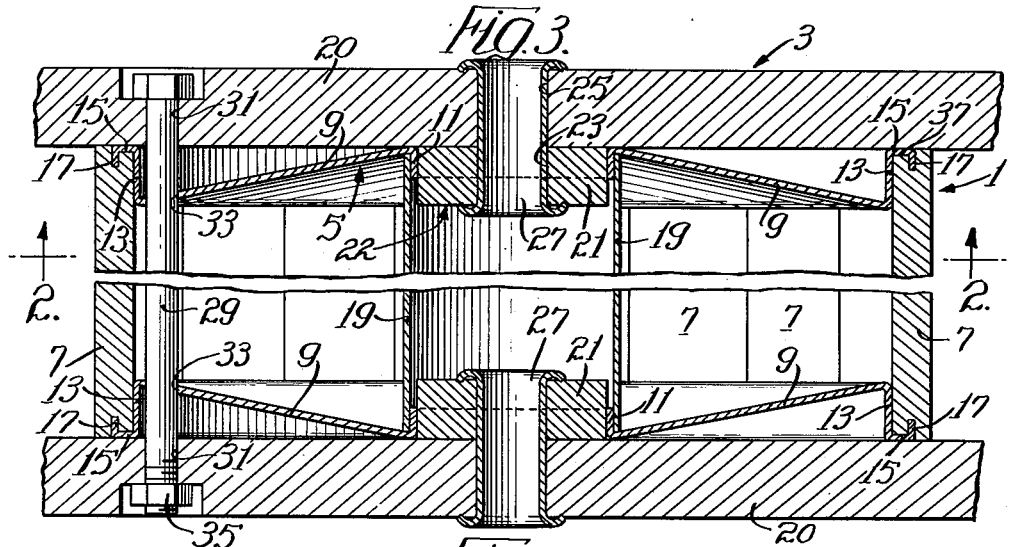
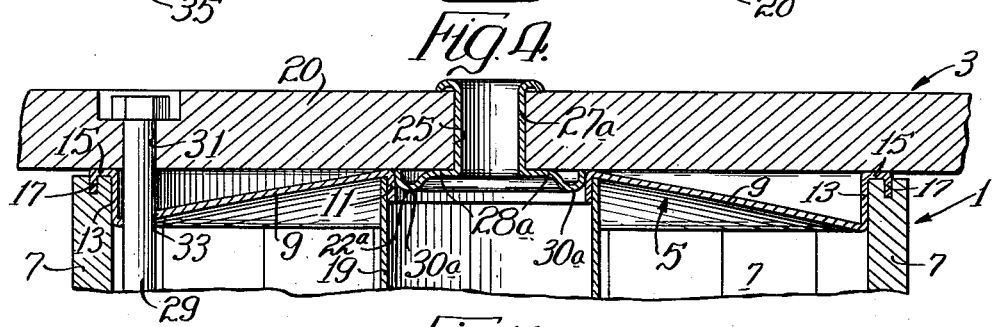
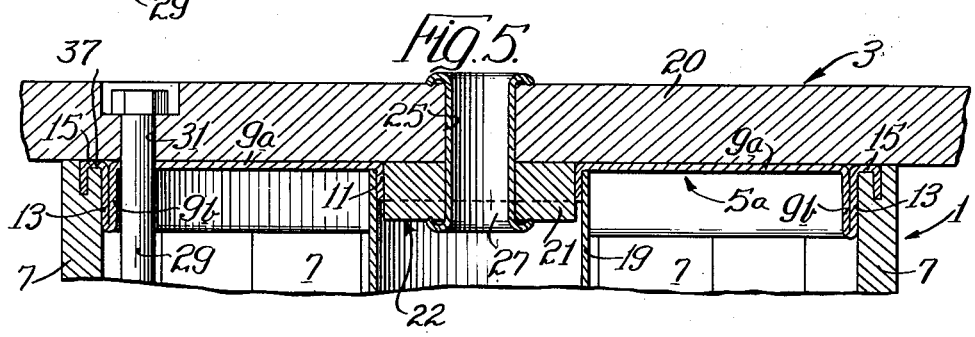
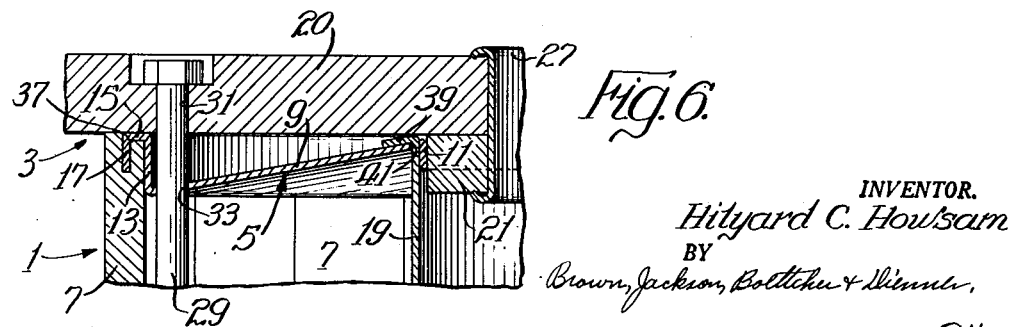
INVENTOR.
Hityard C. Howsam
BY
Brown, Jackson, Boettcher & Dienner
Attys.

July 29, 1952  H. C. HOWSAM  2,605,058
REEL AND DRUM THEREFOR
Filed May 26, 1949  3 Sheets-Sheet 3
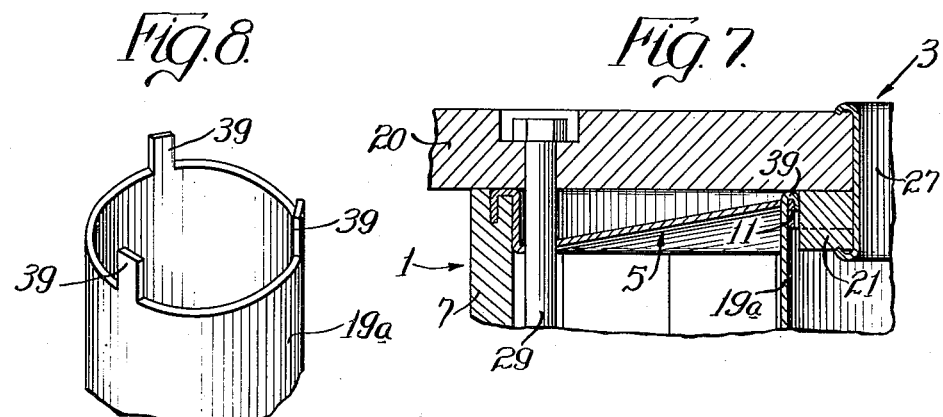
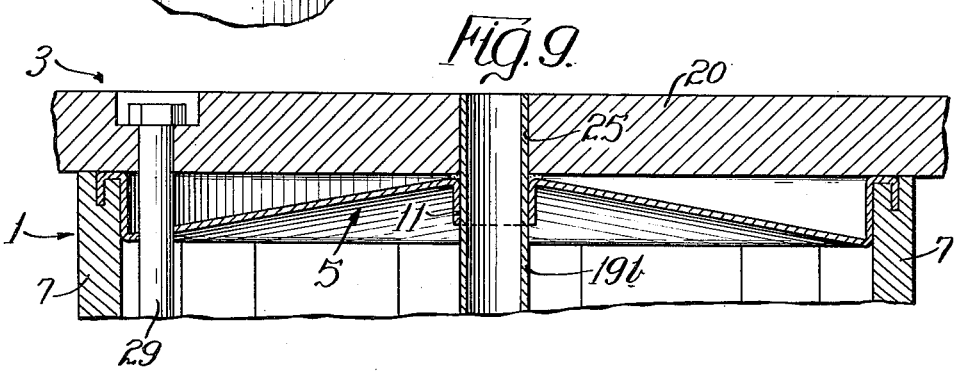
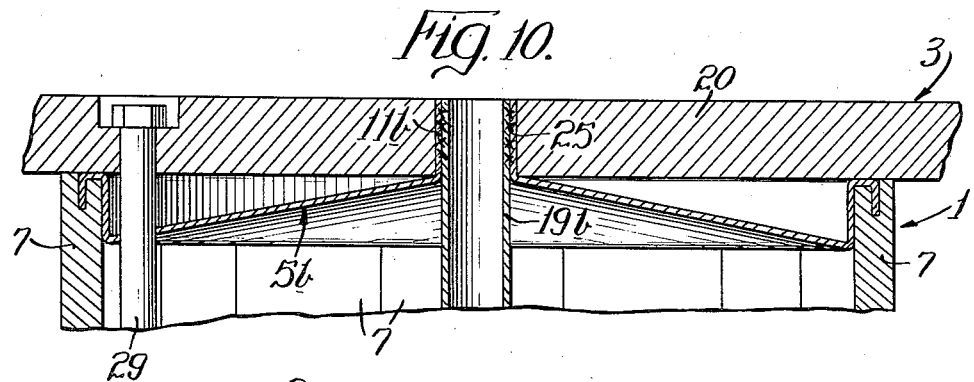
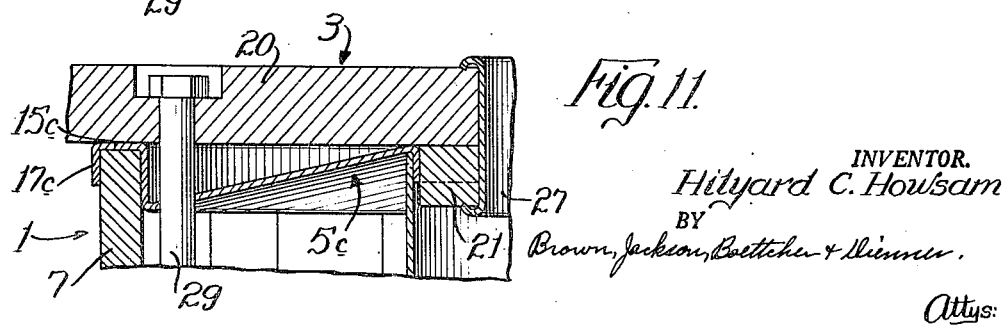
INVENTOR.
Hilyard C. Howsam
BY
Brown, Jackson, Boettcher & Dienner.
Attys:

Patented July 29, 1952

2,605,058

UNITED STATES PATENT OFFICE 2,605,058

REEL AND DRUM THEREFOR

Hilyard C. Howsam, Aurora, Ill.

Application May 26, 1949, Serial No. 95,535

25 Claims. (Cl. 242—124)

My invention pertains generally to a unitary drum for reels to and reels constructed with such drums. More particularly, the invention pertains to such drums and reels as are employed for carrying wire, cable and the like.

It is the main object of my invention to provide a sturdy drum which is a unitary structure, that is, a complete and independent unit which is adapted to be stored or shipped by itself and capable of being employed in connection with flanges formed of different materials and different sizes.

In accomplishing this object, the drum is formed by a plurality of staves which are held in cylindrical relationship by a pair of drum heads, one at each end of the series of staves. The staves are usually made of wood and the heads are formed of metal or other strong material. The drum heads are designed to hold the staves in true cylindrical relationship so that their outer surfaces are equidistantly spaced from the central axis of the drum to thereby provide a well balanced drum. In addition, the heads are adapted to receive the flanges of a reel and hold them at a 90° angle with respect to the central axis of the drum and concentric with said axis so that the entire reel is well balanced.

Not only does the drum of my invention provide the advantages of convenience in shipping and storing and adaptability with respect to its use with a large variety of reel flanges, but it also permits of the use with flanges which cannot, or should not, be recessed to receive the staves. For example, if plywood flanges are to be used, a circular recess which is deep enough to support the staves would cut through the outer plies of the reel flanges and substantially weaken them. The drum of my invention requires no recess of any kind in the flanges for receiving the staves but, instead, provides a sturdy bearing surface against which the flanges are adapted to be disposed at right angles to the axis of the drum.

The heads also provide lateral, or axial, support to the flanges at their central portions so that when the latter are fastened to the drum, as by bolts passing through them, the heads and the drum, the flanges will not be inwardly dished and so that, when the reel is wound with wire or the like which exerts an axially outward pressure against the flanges, the flanges will be prevented from being spread apart.

It is a further advantage of my invention that the accurate and sturdily constructed drum, and the reel constructed with such drum, requires few parts and assembly operations.

Further objects, uses and advantages of the invention will be obvious, or will become apparent, from a consideration of the following description, when taken in connection with the drawings in which:

Figure 1 is a side elevation of a reel and a drum of my invention with one reel flange removed;

Figure 2 is a fragmentary, vertical, sectional view taken substantially on the line 2—2 of Figure 3;

Figure 3 is a fragmentary, horizontal, sectional view, on enlarged scale, taken substantially on the line 3—3 of Figure 1;

Figure 4 is a fragmentary view similar to that of Figure 3, but showing a modification of the centering means and of the use of the drum heads;

Figure 5 is a view similar to Figure 3, but showing another modification of the drum heads;

Figure 6 is a fragmentary view showing a modification of the manner in which the drum heads are secured to the tubular column of the drum;

Figure 7 is a fragmentary, sectional view of another manner in which the tubular column is connected with the drum heads;

Figure 8 is a fragmentary, perspective view of the central tubular column of Figures 6 and 7;

Figure 9 is a fragmentary, sectional view showing another manner in which the central tubular portion may be associated with the drum heads and the flanges of the reel;

Figure 10 is a fragmentary, sectional view showing a modification of Figure 9; and Figure 11 is a fragmentary, sectional view showing a modification of the structure illustrated in Figures 1, 2 and 3.

Referring now to Figures 1, 2 and 3 of the drawings, there will be seen a drum, indicated generally by the reference numeral 1, for a reel, indicated generally by the reference numeral 3. The drum comprises a pair of drum heads, such as the head 5 of Figure 1, and a plurality of staves 7 which are held in their cylindrical relationship and equidistant from the axis of the drum 1 by the heads 5. While the heads 5 and staves 7 are generally made of steel and wood, respectively, other appropriate materials may be employed.

As may be more readily seen from Figure 3, each head 5 is dished at its central portion, as indicated at 9, and at its central aperture has an axially extending flange 11 directed inwardly of the drum 1. In radially outward succession at the margin of each head there is an axially extending portion 13, which is adapted to provide a supporting wall against which the inner surfaces of the staves 7 will be positioned; a radially extending portion 15 which is adapted to engage the ends of the staves 7 and an outermost portion 17 which forms an axially extending flange which is adapted to be pressed into the ends of the staves 7. If desired, the very outermost edge of the portion 17 may be beveled or otherwise sharpened to assist in easy entry of the portion 17 into the ends of the staves. If desired, a circular groove may be cut into the ends of the staves to receive the axially extending portion 17 of the head 5.

To further strengthen the drum, I prefer to employ a centrally disposed tubular column 19 which extends axially of the drum between the heads 5 and fits about the central radially extending flanges 11 of the heads and abuts against the inner surfaces of said heads. It is preferred to fixedly secure the column 19 to the heads 5, for example, the ends of the tubular column 19 may be secured to the axially extending flanges 11 of the heads 5 as by welding, brazing or other securing means. It will be understood that the tubular column 19 could take other shapes, but that the cylindrical form is preferable. If the tubular column is of other shapes, the axially extending flange 11 of the heads 5 should be formed to accommodate the tubular column and dispose it centrally of the drum.

The drum is adapted, by the construction just mentioned, to serve as a unitary article which may be shipped, stored, etc., by itself and without being secured to flanges of reels. It will be readily appreciated that the drum may be employed with flanges of varying diameters and thicknesses. So that the reel formed with the drum may run true and be accurately balanced, some form of centering means between the drum and flanges is desirable. The centering means may take any one of a number of forms. That illustrated in Figures 1, 2 and 3 comprises a block 21 of cylindrical outline formed of wood and apertured at 23 in order to have an opening or aperture corresponding to and in alignment with the arbor hole 25 of the flange 20 of the reel. Preferably, each flange will carry such centering means so that each flange will be properly centered with respect to the drum.

In Figure 3 it may be seen that an arbor tube 27 passes through the aperture 23 of block 21 and the arbor hole 25 of flange 20 and the ends of the arbor tube for each flange are spun over and forced into the surfaces of the flange and block, respectively. The tube 27, therefore, serves to secure the centering means to the flange, although the block 21 may also be glued to its flange 20.

The outer diameter of the block 21, which in Figure 1 comprises the centering means 22, corresponds to the inside diameter of the central axially extending flange 11 of the heads 5. It will be obvious that the drum unit 1 may readily be centered with respect to the flanges 20 by the centering means 22 and the drum and flanges may then be secured together by suitable fastening means. The fastening means illustrated in Figures 1, 2 and 3 comprises a plurality of bolts 29 which pass through apertures 31 in the flanges and apertures 33 of the heads 5. A nut 35 may be threaded onto the end of each bolt. While the flanges 20 are shown as being recessed to accommodate the heads of the bolts 29 and the nuts 35, that is optional and forms no part of my invention.

In the preferred form of my invention, the ends of the staves are recessed as at 37 from a point extending from their inner surface to a location where the axially extending outermost flanges 17 of the heads 5 are pressed into the ends of the staves. The recess 37 corresponds in thickness to the thickness of the radially extending portion 15 of the margin of a head 5 so that the outer surface of the radial portion 15 of the head 5 is flush with the outer ends of the staves 7. The radially innermost portion of each head lies in a plane in which the outer surfaces of the radial portion 15 of the head lies, so that axial or lateral support is supplied for the flanges 20. This support prevents the flanges 20 from becoming dished inwardly when the bolts 29 are drawn up. It will be seen, therefore, that the flanges 20 may be held firmly against the drum and supported at their radially inner and central or outer portions by the heads 5 of the drum 1 and will be held in planes perpendicular to the axis of the reel and of the drum. Such construction provides a reel which runs true about its central axis and which is well balanced in all respects.

In Figure 4 there is shown a modified form of reel structure in which the staves 7 are not recessed as indicated at 37 in Figure 3 but, instead, the radially extending portions 15 of the margins of the heads 5 seat against unrecessed ends of the staves and have their outermost axially extending flanges 17 pressed into the ends of the staves in the same manner as illustrated in Figures 1, 2 and 3. The centering means 22a of Figure 4 comprises the arbor tube 27a, which arbor tube passes through the arbor hole 25 of the flange 20 and has its axially outermost end spun over and forced into the outer surface of the flange 20. The inner end of each arbor tube 27a has an axially extending portion 28a paralleling the inner surface of the flange 20 and a rounded flanged portion 30a which latter portion serves as the centering means for the drum. The outside diameter of the flanged portion 30a corresponds to the inner diameter of the central axially extending flange 11 of the head 5.

In Figure 5 a modified form of head 5a is illustrated, other portions of the reel being similar to that illustrated in Figures 1, 2 and 3. The heads 5a of the reel of Figure 5 have the dished portion 9, such as that illustrated in Figure 3, replaced by a radially extending central portion 9a, the outer surface of which lies in the same plane as the outer surface of the radially extending portion 15 of the head 5a. The central portion 9a is connected to the axially extending portion 13, which provides a wall against which the inner surfaces of the staves 7 abut, by an axially extending portion 9b. The head 5a here also provides means for centering the staves 7 equidistantly from the central axis of the drum and reel and for engaging the ends of the staves while, at the same time, providing lateral support for the flanges 20 of the reel.

Referring now to Figures 6, 7 and 8, there will be seen in Figure 8 a tubular column 19a similar to the column 19 of Figures 1, 2 and 3 except that the ends of the tubular column each have a plurality of tenons 39. As shown in Figure 6, the heads have corresponding slots 41 through which the tenons 39 are adapted to be inserted. The tenons are then bent over against the outer surface of the heads 5, as shown in Figure 6, wherein the tenons extend radially outwardly, or the tenons may be bent radially inwardly as shown in Figure 7. In Figure 7 the ends of the tenons also extend axially and parallel to the axially extending central flanges 11 of the heads 5. In Figure 6, the outermost surfaces of the bent-over tenons 39 lie in the same plane as the outer surface of the radially extending portions 15 of the heads so that firm lateral support is provided for the abutting flanges 20. The same is true of the structure in Figure 7. However, in Figure 7 the radius of the centering block 21 corresponds to the radius extending to the inner surface of the axially extending ends of the tenons 39.

In Figure 9 a reel which is provided similar to that shown in Figures 1, 2 and 3 with the exception that the centering means avoids the use of centering blocks, or the like, carried by the reel flanges and instead employs the tubular column, such as the column 19 of Figures 1, 2 and 3, as the centering means. Referring now more specifically to Figure 9, it will be seen that the tubular column 19b of the reel 3 is of smaller diameter than that shown in Figures 1, 2 and 3 and is adapted to be passed through the axially extending central flange 11 of the head 5 and to extend axially therebeyond and fit within the arbor hole 25 of the flange 20 and serve as the arbor tube for said flange. The tubular column 19b may be secured to the heads 5 in various ways, brazing being shown in Figure 9.

The reel illustrated in Figure 10 is a modification of that shown in Figure 9, the only difference being that the axially extending central flanges 11b of the heads 5b extend axially outwardly relative to the drum 1 and fit within the arbor hole 25 of the flange 20. The central tubular column 19b then fits within the flanges 11b and may be secured thereto by various methods, welding being shown in Figure 10. It will be seen that the heads 5b adjacent the axially extending flanges 11b provide lateral support at the central portion of the flanges as in other previously described modifications of the invention.

Figure 11 shows a modification of the structure illustrated in Figures 1, 2 and 3, the only differences being that the heads 5c of the drum 1 have their radially extending portions 15c of the margins of the heads engaging the entire ends of the staves 7, instead of only a portion of the ends, and that the axially extending outermost flanges 17c engage the outer surfaces of the staves 7 instead of being pressed into the outer ends of said staves. In all other respects, the reel of Figure 11 is the same as the reel of Figures 1, 2 and 3.

While I have shown a preferred embodiment and certain modifications of the invention, I do not intend to be limited thereto, except insofar as the appended claims are so limited, since various changes and modifications coming within the scope of the claims will be suggested to others by my disclosure.

I claim:

1. A reel comprising a pair of flanges each having a central arbor hole, a unitary drum comprising a cylinder formed of a plurality of staves and a pair of drum heads engaging the staves at their end portions along their inner walls and end walls for holding them in their cylindrical relationship, means centering the drum with respect to the arbor holes of the flanges, and means for securing the flanges and drum together.

2. A unitary drum structure for reels comprising a pair of heads, a plurality of staves held in cylindrical relationship by said heads which engage the staves along their inner walls and at their ends, and hold them parallel to and equi-distant from the central axis of the drum.

3. The drum structure of claim 2 wherein the heads include central portions and wherein said central portions and the portions engaging the staves are adapted to form a bearing surface and lateral support at right angles to the central axis of the drum for the flanges of the reel to which the drum is adapted to be connected.

4. A unitary drum structure for reels comprising a pair of heads each being centrally apertured, a plurality of staves held in cylindrical relationship by said heads which engage the staves along their inner walls and at their ends and hold them parallel to and equi-distant from the central axis of the drum, and a tubular column extending axially between the heads and being secured thereto at the central portions of said heads.

5. A unitary drum structure for reels comprising a pair of heads each being centrally apertured, a plurality of staves held in cylindrical relationship by said heads which engage the staves along their inner walls and at their ends and hold them parallel to and equi-distant from the central axis of the drum, a tubular column extending axially between the heads and being secured thereto at the central portions of said heads, and an axially extending flange about the central aperture of each head.

6. The drum structure of claim 5 wherein the tubular column is secured to said axially extending flanges of said heads.

7. The drum structure of claim 6 wherein the axially extending flanges about the central apertures of each head are directed inwardly of the drum and the tubular column has its ends secured to and about said axially extending flanges.

8. The drum structure of claim 6 wherein the axially extending flanges of the heads are directed outwardly and the tubular column is adapted to fit within said flanges and be connected thereto, the flanges and column being adapted to be fitted within the arbor holes of the flanges of a reel.

9. The drum structure of claim 4 wherein the ends of the central tubular column extend axially beyond the planes defined by the heads and are adapted to fit within the arbor holes of a flange.

10. The drum structure of claim 4 wherein the tubular column has tenons at its opposite ends which are passed through cooperating slots, disposed about the central apertures of the heads, and bent over and into engagement with the outer surface of the heads.

11. A unitary drum structure for reels comprising a pair of heads, a plurality of staves held parallel to and equi-distant from the central axis of the drum by said heads, each of said heads having in radially outward succession at its margin an axially extending portion adapted to provide a supporting wall portion for the inner surface of the staves, a radially extending portion engaging the ends of the staves and providing an abutting surface on its outer side for the inner side of a reel flange, and a radially outer-most portion comprising an axially extending flange adapted to be pressed into the end of the staves.

12. The drum structure of claim 11 wherein each of the heads is dished at its central portion and said central portion has its outer surface disposed substantially in the plane defined by that portion of the margin which engages the ends of the staves.

13. The drum structure of claim 11 wherein the staves have their end portions cut away from their inner surface radially outwardly to that portion at which the radially outward-most portion of the heads is pressed into the ends of the staves, whereby the outer surface of the heads and the end surfaces of the staves are flush and lie in a plane perpendicular to the central axis of the traverse.

14. A unitary drum structure for reels comprising a pair of heads, a plurality of staves held parallel to and equi-distant from the central axis of the drum by said heads, each of said heads having in radially outward succession at its margin an axially extending portion adapted to provide a supporting wall portion for the inner surface of the staves, a radially extending portion engaging the ends of the staves and providing an abutting surface on its outer side for the inner side of a reel flange, and a radially outer-most portion comprising an axially extending flange adapted to fit along the outer surface of the staves.

15. A reel comprising a pair of flanges each having a central arbor hole, a unitary drum comprising a cylinder formed of a plurality of staves and pair of centrally apertured drum heads engaging the staves at their ends and holding them in cylindrical relationship, means centering the drum with respect to the arbor holes of the flanges, said drum heads being dished and each having an axially extending flange about its aperture with the flanges of the heads being adapted to cooperate with the centering means, and the means for securing the flanges and drum together.

16. A reel comprising a pair of flanges each having a central arbor hole, a unitary drum comprising a cylinder formed of a plurality of staves and pair of centrally apertured drum heads engaging the staves at their end walls and holding them in their cylindrical relationship, means centering the drum with respect to the arbor holes of the flanges, said centering means comprising an apertured axially extending member connected to each reel flange about its arbor hole and about which member an aperture in a drum head is adapted to fit, and means securing the flanges and drum together.

17. A reel comprising a pair of flanges each having a central arbor hole, a unitary drum comprising a cylinder formed of a plurality of staves and pair of centrally apertured drum heads engaging the staves at their end walls and holding them in their cylindrical relationship, means centering the drum with the respect to the arbor holes of the flanges, said centering means comprising an arbor tube for a reel flange, which arbor tube, at its inner end, has a flange about which the aperture of a drum head fits, and means for securing the flanges and drum together.

18. A reel comprising a pair of flanges each having a central arbor hole, a unitary drum comprising a cylinder formed of a plurality of staves and a pair of centrally apertured drum heads engaging the staves at their ends and holding them in their cylindrical relationship, means centering the drum with respect to the arbor holes of the flanges, said centering means comprising a central axially extending tubular member which passes through the apertures in the drum heads, is secured thereto, and is adapted to extend into the arbor holes in said flanges, and means for securing the flanges and drum together.

19. A reel comprising a pair of flanges, a unitary drum comprising a cylinder formed of a plurality of staves and a pair of drum heads engaging the staves at their ends and holding them in their cylindrical relationship, means centering the drum with respect to the flanges, and means for securing the flanges and drum together, each of the drum heads having a marginal portion providing in succession an axially extending portion adapted to provide a supporting wall portion for the inner surface of the staves, a radially extending portion adapted to engage the end walls of the staves and to provide an abutting surface for the inner side of the flange, and a radially outermost portion comprising an axially extending flange adapted to be pressed into the end wall of the staves.

20. A unitary drum structure for reels comprising a pair of heads, a plurality of staves held in cylindrical relationship by said heads which engage the staves along their inner walls and at their ends and hold them parallel to and equidistant from the central axis of the drum, and a tubular column extending axially between the heads and being secured thereto at the central portions of said heads.

21. A drum head for a reel drum said head being of generally dish shape with its outer margin providing a radially extending surface adapted to bear against the end walls of the staves, or the like, of the drum, and an adjacent axially extending surface adapted to bear against the inner wall which is formed by the drum staves, or the like.

22. The head of claim 21 wherein in the radially outermost portion of the margin of the head has an axially extending flange adapted to be seated in the end walls of the staves.

23. The head of claim 21 wherein the center portion of the head provides an axially extending bearing surface adapted to cooperate with a central axially extending supporting member of the drum.

24. The head of claim 21 wherein the center portion of the head and the radially extending surface of the margin of the head are adapted to provide a bearing surface and a lateral support for the flange of a reel.

25. A reel comprising a pair of flanges, a drum comprising a cylinder formed of a plurality of staves, a generally arcuate groove in both end walls of each stave with the grooves of adjacent staves interconnecting with each other to form a generally circular groove at each end of the cylinder, a pair of drum heads at opposite ends of the cylinder engaging the staves along their inner walls for spacing the staves radially an equal distance from the axis of the drum, means disposed in the generally circular grooves in the end walls of the cylinder to prevent outward separation of said staves from their cylindrical relationship, means centering the drum with respect to the axis of the flanges, and means for securing the flanges and drums together.

HILYARD C. HOWSAM.

REFERENCES CITED

The following references are of record in the file of this patent:

UNITED STATES PATENTS

| Number | Name | Date |
|---|---|---|
| 503,227 | Benham | Aug. 15, 1893 |
| 1,478,805 | Tuttle | Dec. 25, 1923 |
| 1,484,155 | Peterson | Feb. 19, 1924 |
| 1,588,017 | Feely | June 8, 1926 |
| 2,148,394 | Thornton | Feb. 21, 1939 |
| 2,203,584 | Thornton | June 4, 1940 |
| 2,236,188 | Thornton | Mar. 25, 1941 |